US006055738A

United States Patent [19]

Bardeen et al.

[11] Patent Number: 6,055,738

[45] Date of Patent: May 2, 2000

[54] STENCIL AND KIT FOR TRANSFERRING IMAGES AND METHOD THEREFOR

[75] Inventors: Kea L. Bardeen, Denver, Colo.; James Egitto, Pottstown, Pa.

[73] Assignee: Pumpkin Ltd., Denver, Colo.

[21] Appl. No.: 09/028,217

[22] Filed: Feb. 23, 1998

[51] Int. Cl.[7] .............................. G01B 3/00; B65D 69/00

[52] U.S. Cl. ............................................. 33/566; 206/575

[58] Field of Search ............................ 33/562, 563, 564, 33/566, 1 G, 13, 12, 14, 15, 16; 434/87; 206/575

[56] References Cited

U.S. PATENT DOCUMENTS

| | | | |
|---|---|---|---|
| 3,633,286 | 1/1972 | Maurer | 33/563 |
| 3,816,924 | 6/1974 | Cutri | 33/17 R |
| 3,855,924 | 12/1974 | Morse, Jr. | 33/563 |
| 3,888,009 | 6/1975 | White et al. | 33/565 |
| 4,828,114 | 5/1989 | Bardeen | 206/575 |
| 5,141,438 | 8/1992 | Spector | 434/87 |
| 5,195,893 | 3/1993 | Casale | 33/565 |
| 5,533,900 | 7/1996 | Volk | 118/301 |

FOREIGN PATENT DOCUMENTS

| | | | |
|---|---|---|---|
| 2002132 | 10/1969 | France | 33/563 |
| 2115374 | 9/1983 | United Kingdom | 33/563 |

*Primary Examiner*—Adolf Denske Berhane
*Assistant Examiner*—Pia Tibbits
*Attorney, Agent, or Firm*—Timothy J. Martin; Michael R. Henson; Mark H. Weygandt

[57] ABSTRACT

The present invention is directed to a stencil adapted for use in transferring an image to a substrate where the image is formed by an ensemble of individual features for a predetermined image. The stencil comprises a sheet of flexible material and a plurality of holes formed through the sheet. The holes are organized in hole sets such that the holes in each such hole set outline a respective individual feature. The hole sets together define the pre-determined image to be transferred. The present invention also includes a kit for use in transferring an image to an outer surface area of a vegetable. The kit comprises a stencil adapted for use in transferring an image to the surface area of the vegetable, a tool adapted to cut first portions of the vegetable, a marker including a marking medium, a set of instructions, and a package that receives the stencil, tool, marker and set of instructions. Additionally, the present invention is directed to a method of forming an image in a fleshy shell of a vegetable. The method comprises the steps of cutting open and cleaning out the vegetable so as to create a shell, securing a pattern sheet to an outer surface area thereof, coloring the pattern sheet with a marking medium to produce a discernable segmented outline, and cutting around each segmented outline and through the shell.

16 Claims, 2 Drawing Sheets

STENCIL AND KIT FOR TRANSFERRING IMAGES AND METHOD THEREFOR

FIELD OF THE INVENTION

The present invention broadly concerns stencils and kits used for transferring images onto surfaces for decorative purposes. More particularly, however, the present invention is directed to carving or painting decorative designs on the fleshy shells of vegetable products. Specifically, the present invention is directed to a stencil base carving system for pumpkins that is especially adapted for use by small children.

BACKGROUND OF THE INVENTION

Mankind's fascination with painting and carving images dates back to the dawn of history. Virtually every culture has employed some form of carving or painting as an outlet of artistic expression. Indeed, images have been carved, etched or painted on a wide variety of materials including wood, stone, ceramics, metal and the like to lend permanence to the image created.

In some instances, however, images are carved in a material that is not intended to last. One such example is the carving of images or decorative designs into the fleshy shell of a vegetable that is used as a holiday decoration, a theme decoration, a center piece or other temporary decorative item. Perhaps the most significant example of the use of carved designs in vegetables occurs for the holiday event known as Halloween. Here, decorative designs are typically carved through the fleshy shell of pumpkins, and the interior of the pumpkin is illuminated by a candle or other light often to give a playfully spooky appearance to the image provided. At the present time, Halloween is one of the fastest growing of all holidays both in the United States and other countries.

In the past, the standard method of carving pumpkins simply involved the use of a sharp knife to form individual facial elements in a pumpkin shell so as to make a jack-o-lantern face. Alternatively, portions of the pumpkin skin were scraped away thereby creating a color contrast that defined the image to be perceived. If sufficient skin of the pumpkin was removed, the interior lighting of such a pumpkin would create contrasting translucent and opaque regions that would produce a desired image.

The intricate carving of pumpkins on a wide scale basis came about in the mid-1980's as a result of the introduction of a pumpkin carving kit by the assignee of the present invention. The elements of this kit are set forth in U.S. Pat. No. 4,828,114 entitled Pumpkin Carving Kit issued May 9, 1989 to Bardeen. In the kit described in the '114 Patent provides elaborate patterns that are transferred onto the surface of a pumpkin by poking small holes through the patterns. After the holes are made, saws and drills are used for the cutting of intricate features through the shell of the pumpkin. Thus, extremely elaborate designs and images became possible even for those having only basic artistic skills.

While the pumpkin carving kits exemplified by the '114 Patent have had wide commercial success and have greatly increased the enjoyment of the festive holiday for many persons, these kits nonetheless have a slight drawback when the "pumpkin artist" is a small child. Relatively young children may experience some difficulty in transferring the pattern onto the surface of the pumpkin prior to carving the same. Also, the use of relatively sharp, fine toothed saws is sometimes difficult for such children and may be uncomfortable even though the tools do not pose any substantial danger to the user.

Therefore, although the pumpkin carving kit described in the '114 Patent revolutionized pumpkin carving, there remains a need for an improved method and apparatus, which may be in kit form, that is more accessible to younger children. The present invention is directed to meeting such need in an effort to expand the imagination and creativity of this younger group.

SUMMARY OF THE INVENTION

It is an object of the present invention to provide a new and useful method of pumpkin carving that can be enjoyed by a relatively young child.

It is a further object of the present invention to provide a stencil that is constructed to facilitate the transfer of an image onto a substrate, especially the fleshy shell of a vegetable, so that it may thereafter be readily carved.

Still a further object of the present invention is to provide a carving kit that employs a stencil, at least one tool and a transfer medium that simplifies the carving of individual features that create an image in the substrate.

In order to accomplish these objects, then, the present invention is broadly directed to a stencil that is directed for use in transferring an image to a substrate. The stencil includes a sheet formed of a flexible material so that the sheet may be conformed to the shape of the surface onto which the image is to be transferred. A plurality of holes is formed through the sheet, and these holes are organized in hole sets with the hole sets defining an ensemble of individual features of the image to be transferred. It is preferred that a band of a selected color extend between the holes of each hole set and on lateral sides thereof so as to outline a respective individual feature. That is, the holes are actually disposed within the band and completely surrounded by the selected band color. Each of the holes in the hole set are preferably uniformly spaced from adjacent ones of the holes.

A plurality of perforation lines may be disposed around the peripheral margin of the sheet with these perforation lines extending toward a central region thereof. These perforation lines are operative to permit separation of the sheet therealong so that portions of the sheet which are lateral adjacent to each of the separation lines are then capable of being overlaid to one another thereby to contour the sheet to the substrate surface. Preferably, these separation lines are radial. A peripheral perforation line may also extend in surrounding relation to the ensemble of the individual features whereby the ensemble is capable of removal from a remainder of the sheet thus to define a pattern sheet containing the individual features. This peripheral perforation line may be oval in shape. Index markings may be provided to intersect the perforation line thereby to define suggested attachment locations identified for securing the pattern sheet to the substrate.

The stencil according to the present invention may also be incorporated into a kit for transferring image to a substrate, such as the outer surface of a vegetable. Thus, the present invention also contemplates such a kit. Here, the stencil is formed as above, and the kit further includes at least one but preferably a plurality of tools which are adapted to cut portions of the substrate for removal from a main body portion thereof. These tools may include saws, drills, scoops or other implements especially designed to cut different features. The kit includes a marker that includes a marking medium of a type suitable for forming a non-smearing mark on the outer surface of the substrate. A set of instructions is provided with these instructions being correlated to use of the stencil and to the markup for transferring the individual features of the image onto the outer surface area of the substrate surface and with the instructions being further correlated to use of the selected tool for removal of the first portions of the substrate surface from the main body portion. Finally, a package receives the stencil, the tool(s), the marker and the set of instructions.

As noted above, the stencil has a plurality of holes that are contained within a band that outlines the individual design feature. This band is of a color selected from a group consisting of black, gray, brown, dark blue, purple, dark red and dark green. Further, the marking medium is then selected to be a second color that is substantially masked by the first color when applied thereover. The marker is selected from a group consisting of oil-pastel crayons and grease pencils. The kit may also include a plurality of different stencils so that different designs may be produced.

The present invention also is directed to a method of forming an image on a substrate surface, especially the fleshy shell of a vegetable, such as a pumpkin. Here, the method comprises the first step of cutting an access opening into an interior of the vegetable. Next, the interior of the vegetable is cleaned so as to create a shell having a selected thickness. After cleaning the interior of the vegetable, the method includes the step of securing a pattern sheet to an outer surface area of the shell wherein the pattern sheet is provided with a plurality of holes formed therethrough and organized in hole sets which define an ensemble of individual features of the image to be produced with each hole set outlining a respective individual feature. Next, the method includes coloring the pattern sheet with a marking medium so that some of the marking medium passes through each hole in the hole sets thereby producing a discernable segmented outline of each respective individual feature on the outer surface area of the shell. Finally, the method includes the step of cutting around each segmented outline and through the shell so as to remove portions thereof corresponding to each respective individual feature. The method may include the step of marking around each segmented outline so as to transform the segmented outline into a solid line extending around the respective individual feature.

These and other objects of the present invention will become more readily appreciated and understood from a consideration of the following detailed description of the exemplary embodiments when taken together with the accompanying drawings, in which:

DETAILED DESCRIPTION OF THE EXEMPLARY EMBODIMENTS

The present invention concerns a stencil that may be used to transfer a desired image onto a selected substrate as well as a kit incorporating such stencil and other elements. The present invention is particularly useful for small children in the decorative carving of vegetable shells, such as pumpkins, watermelons and the like. As such, the present invention also is directed to a method of transferring an image onto a surface, such as a pumpkin shell, in preparation for either the carving or painting of that shell with a decorative design. For purposes of explaining the exemplary embodiment, the substrate surface depicted is that of a pumpkin although it should be appreciated that the present invention is by no means limited to a stencil for transferring patterns onto just a pumpkin shell.

Figure 1:
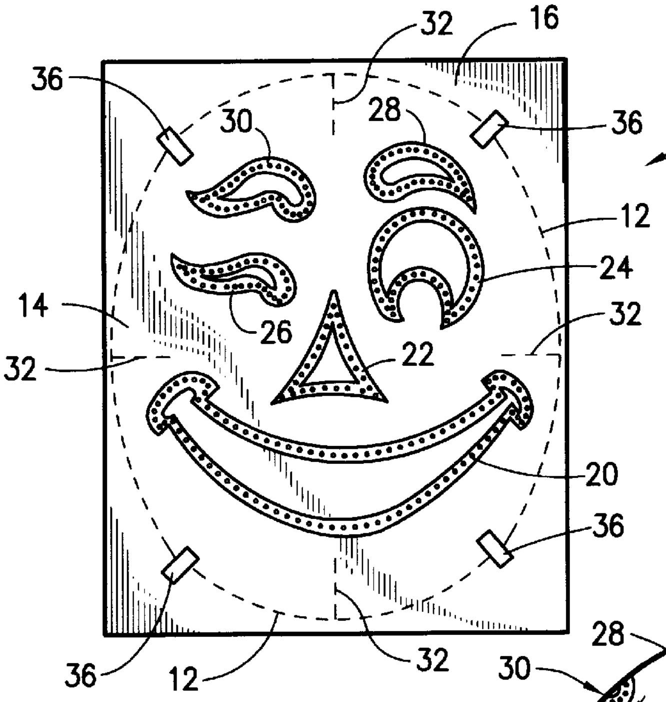
FIG. 1 is a front view in elevation showing a stencil according to the exemplary embodiment of the present invention.

With reference, then, to FIG. 1, it may be seen that the present invention is directed to a stencil sheet 10 that is adapted for use in transferring an image to a substrate. Stencil sheet 10 is constructed of any suitable material, such as paper or plastic film. A peripheral perforation line 12 extends in surrounding relation to an ensemble of individual image features so as to define a pattern sheet 14 containing those features. For illustration purposes only, it may be seen that the individual features of the image of FIG. 1 include a mouth 20, a nose 22, an open eye 24, a partially closed eye 26 and a pair of eyebrows 28 and 30. Peripheral perforation line 12 is shown to be generally oval in shape so that pattern sheet 14 is oval in construction.

Figure 2:
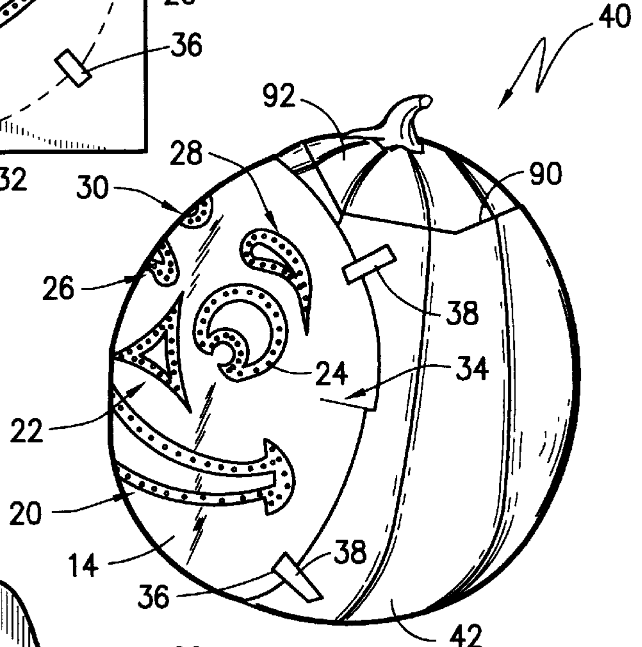
FIG. 2 is a perspective view showing the pattern sheet from the stencil of FIG. 1 affixed to the outer surface of a vegetable, namely, a pumpkin.

With reference to FIG. 2, it may be seen that pattern sheet 14 is capable of removal from the remainder or marginal portion 16 of stencil sheet 10, along peripheral perforation line 12, so that pattern sheet 14 may be removably secured to the external surface of the substrate. In FIG. 2, this is illustrated as surface 42 of pumpkin 40. To facilitate the contouring or conforming of pattern sheet 14 to the shape of the outer surface 42, stencil 10 is provided with a plurality of perforation lines 32 which are disposed around the peripheral margin portion of stencil sheet 10 and extend toward the central region of the sheet. Preferably, perforation lines 32 extend radially towards the center of stencil sheet 10.

Perforation lines 32 are operative to permit separation of sheet 10 therealong so that portions of the sheet which are laterally adjacent to each respective separation line are capable of being overlaid on one another as is shown at 34 in FIG. 2. This allows flat pattern sheet 14 to be contoured, for example, into a portion of a hemispherical surface corresponding to the outer shell of pumpkin 40. Further, in order to suggest attachment locations for pattern sheet 14 to surface 42, stencil sheet 10 includes a plurality of index markings 36 which are disposed around peripheral perforation line 12 at relatively equiangular locations. Index markings 36 are rectangular areas that intersect perforation lines 12. As shown in FIG. 2, tape pieces 38 are placed on index markings 36 to fasten pattern sheet 14 to pumpkin 40.

Figure 3:
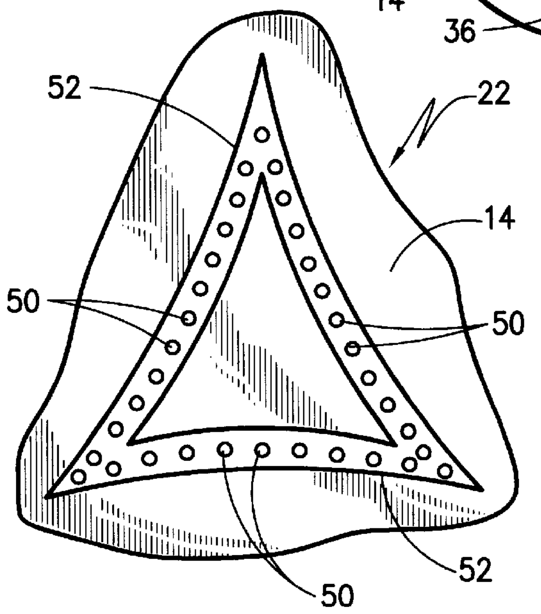
FIG. 3 is a front view in elevation of a representative individual design feature of a stencil and pattern sheet of FIG. 1 according to the exemplary embodiment of the present invention.

With reference to FIG. 3, a representative image feature, in the form nose feature 22, is shown to illustrate the construction of such image features. As may be seen in FIG. 3, each image feature is formed by a plurality of holes, such as holes 50 that are organized in hole sets which define each of the individual features comprising the ensemble of features that form the image to be transferred. In FIG. 3, holes 50 generally take the appearance of equilateral triangle although it may be seen in reference to FIG. 1 that the hole sets may take virtually any desired pattern for a desired design feature. Holes 50 are preferably circular openings with each hole 50 being generally equidistantly spaced from its adjacent holes around the image feature, as is shown in FIG. 3. It should be appreciated, however, that other shapes of openings through stencil sheet 10 are within the scope of this invention.

In any event, it is desirable that a band, such as band 52, of a selected color extend between each of holes 50 in each hole set and along the lateral sides thereof so as to outline a respective individual feature. That is, each band, such as band 52, is an outline of the selected design feature to be transferred and reproduced with each hole 50 being completely surrounded by the band color. This band color is preferably selected from a group consisting of: black, grey, brown, dark blue, purple, dark red and dark green.

In use, as described more thoroughly below, each individual design feature is to be colored over by a suitable crayon or marker so that the marking medium passes through each hole 50 to transfer the individual design features of the overall image as a pattern of dots onto the substrate surface. By having a dark band 52 of these selected colors, the underlining substrate (such as the orange surface of a pumpkin) becomes highlighted. Each opening or hole 50 then allows the user to focus on the opening so that, when colored, it is easy to determine that all holes have been filled in. The dark band 52 is selected to mask the color of the transfer medium on the pattern itself which again facilitates visual confirmation that the transfer operation onto the substrate has been properly completed.

Figure 4:
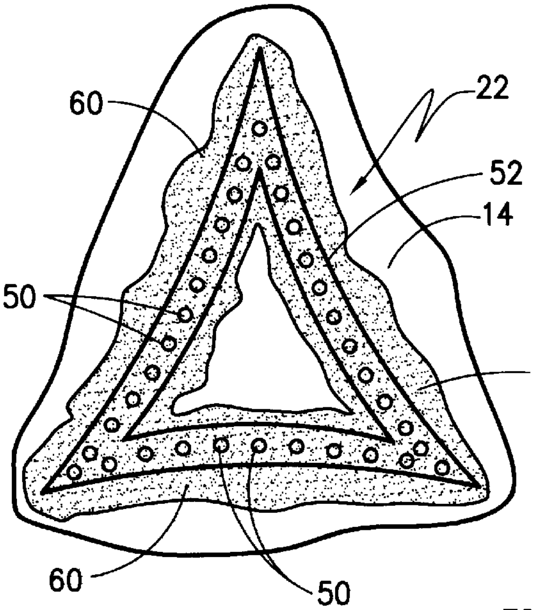
FIG. 4 is a front view in elevation, similar to FIG. 3, showing the portions of the pattern sheet being colored thereover with a marker.
Figure 5:
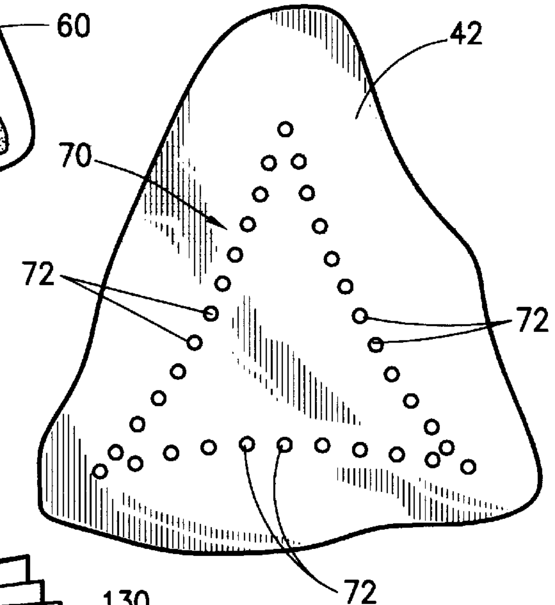
FIG. 5 is a front view in elevation, similar to FIG. 4, but showing the transferred pattern of the design element of FIGS. 3 and 4.

With now to FIGS. 4 and 5, it may be seen that nose feature 22 has been colored over by a marking medium 60 so that each hole 50 has been filled in with the marking medium. Band 52 is still visible since it is of a dark enough color to dominate over the color of the marking medium 60. Upon removal, as is shown in FIG. 5, a pattern 70 formed by a plurality of dots 72 remains on surface 42 of the pumpkin that take the appearance of the design feature to be created.

By being capable of producing the pattern of dots corresponding to the outline of the desired design feature, the stencil sheet 10 of the present invention differs substantially from prior art stencils which have openings that take on the entire design feature. Such stencils, while quite useful in transferring images onto flat surfaces, for example, are less unsuitable for transferring a pattern to a rounded surface such as the outer surface of a pumpkin shell. A traditional stencil would ripple and exhibit a variety of alignment problems when used upright on a somewhat spherical surface area so that the transferred image would become more distorted. Further, it would be more difficult, especially for a young child, to obtain a distinct outline as a guide for carving with traditional stencils. However, by employing a stencil that yields a pattern of dots, such as shown in FIG. 5, the design is transferred in rather sharp detail regardless of how unskillful the coloring of the design features is.

Figure 6:
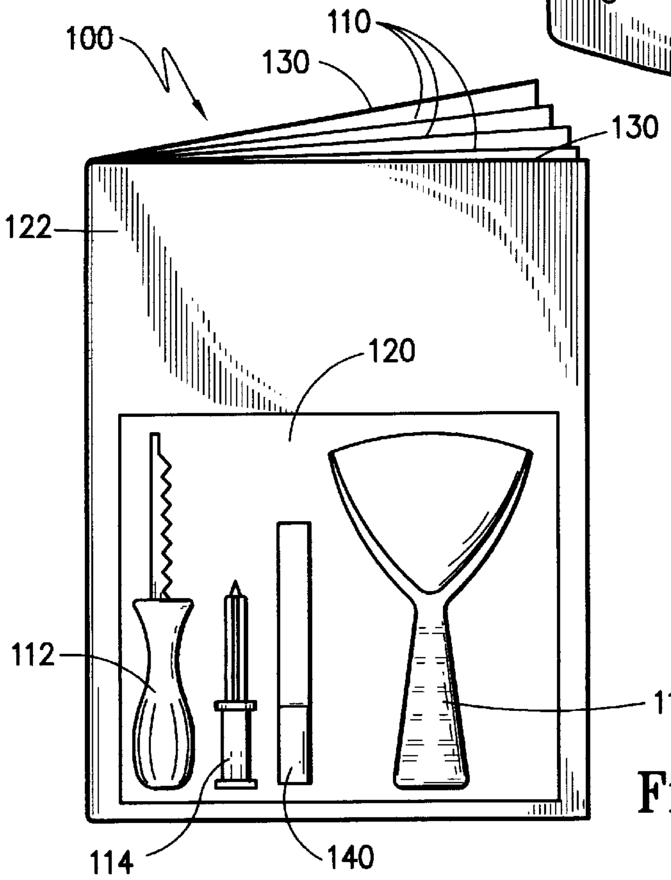
FIG. 6 is a perspective view of a kit in booklet form according to the exemplary embodiment of the present invention.

As mentioned above, the present invention is also directed to a kit which is used in transferring an image, for example, to the outer surface of a vegetable. The preferred embodiment of the kit 100 shown in FIG. 6 and includes at least one stencil but preferably a plurality of stencils 110 which are each constructed as described above with respect to stencil 10. At least one tool is provided in kit 100 with this tool being adapted to cut first portions of the vegetable or substrate surface for removal from a main body portion thereof. As is shown in FIG. 6, however, a plurality of tools are associated with kit 100 and include, again for example, a safety carving saw 112, a drill 114 and a scoop 116 which are received on kit 100 such by a plastic blister pack 120 on package 122. Here, package 122 is in the form of a booklet that includes instruction sheets 130.

Kit 100 also includes a marker 140 that is secured to package 122 by blister pack 120. Marker 140 includes a marking medium of a type suitable for forming non-smearing marks on the outer surface of the vegetable. This marking medium is of a second color, different from the color of the band 52 described with respect to stencil 10 (and stencils 110) that is of a color that is substantially masked by the first color when applied thereover. Marker 140 may, for example, be an oil-pastel crayon, grease pencil, ball point pen, permanent marker or the like. Preferably, an oil-pastel crayon is used since it is found to be particularly compatible with the surface of a pumpkin, is non-toxic, does not smear and yet can be removed by rubbing. Instruction sheets 130 are provided with instructions that are correlated to use of the stencil and to the marker for transferring the individual features of the image onto the outer surface area of the pumpkin and are correlated to use of the tool or tools for removal of first portions of the substrate from the main body portion of the pumpkin.

From the foregoing, it may also be appreciated that the present invention is directed to a method of forming an image in the fleshy shell of a vegetable, such as a pumpkin. This method includes a step of cutting an access opening into the interior of the vegetable. For example, with reference again to FIG. 3, it may be seen that access opening 90 is cut into pumpkin 40 to form a lid 92 therefor. Removal of lid 92 allows access to the interior of pumpkin 40 so that the method includes the next step of cleaning the contents of the vegetable located in interior thereof so as to create a shell having a selected thickness.

The method according to the present invention then includes the step of securing a pattern sheet to an outer surface area of the shell of the pumpkin wherein the pattern sheet is provided with a plurality of holes formed therethrough and organized in hole sets which define an ensemble of individual features of the image with each hole set outlining a respective individual feature. Next, the method includes the step of coloring the pattern sheet with a marking medium so that some of the marking medium passes through each of the holes in each hole set thereby to produce a discernable segmented outline of each respective individual feature on the outer surface area of the shell. Finally, the method according to the present invention includes the step of cutting around each segmented outline and through the shell so as to remove portions thereof corresponding to each respective individual feature.

If desired, the method can include the step of marking around each segmented outline, that is, "joining the dots" to transform the segmented outline into a solid line depicting the respective image feature. The method may replace the step of cutting with a step of painting the design feature.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A stencil adapted for use in transferring an image to a substrate where said image is formed by an ensemble of individual features for a predetermined image, comprising:

(a) a sheet of flexible material; and (b) a plurality of holes formed through said sheet, said holes organized in hole sets such that the holes in each such said hole set outline a respective individual feature, said hole sets together defining the predetermined image to be transferred.

2. A stencil according to claim 1 including a band of a selected color extending between the holes of each hole set and on lateral sides thereof so as to outline a respective individual feature.

3. A stencil according to claim 2 wherein each said hole is completely surrounded by the selected color.

4. A stencil according to claim 1 wherein each hole in a respective hole set is substantially uniformly spaced from holes that are adjacent thereto.

5. A stencil according to claim 1 including a plurality of perforation lines disposed around a peripheral margin of said sheet and extending toward a central region of said sheet, said perforation lines operative to permit separation of said sheet therealong so that portions of said sheet laterally adjacent each said separation line are capable of being overlaid on one another.

6. A stencil according to claim 1 including a peripheral perforation line extending in surrounding relation to the ensemble of the individual features whereby said ensemble is capable of removal as a pattern sheet from a remainder of said sheet.

7. A stencil according to claim 6 wherein said peripheral perforation line is oval in shape.

8. A stencil according to claim 6 including index markings intersecting said perforation line to define suggested attachment locations for securing said pattern sheet to the substrate.

9. A kit for use in transferring an image to an outer surface area of a vegetable, comprising:

(a) a stencil adapted for use in transferring an image to the surface area of the vegetable where said image is formed by an ensemble of individual features for a predetermined image, said stencil formed as a sheet of flexible material having a plurality of holes formed therethrough, said holes organized in hole sets such that the holes in each such said hole set outline a respective individual feature, said hole sets together defining the predetermined image to be transferred;

(b) a tool adapted to cut first portions of the vegetable for removal from a main body portion thereof;

(c) a marker including a marking medium of a type suitable for forming non-smearing marks on the outer surface area of said vegetable;

(d) a set of instructions correlated to use of said stencil and said marker for transferring the individual features of the image onto the outer surface area of said vegetable and correlated to use of said tool for removal of said first portions of the vegetable from the main body portion; and (e) a package receiving said stencil, said tool, said marker and said set of instructions.

10. A kit according to claim 9 wherein said stencil including a band of a first color extending between the holes of each hole set and on later sides thereof so as to outline a respective individual feature.

11. A kit according to claim 10 wherein the selected color is selected from a group consisting of: black, gray, brown, dark blue, purple, dark red and dark green.

12. A kit according to claim 10 wherein said marking medium is a second color that is substantially masked by said first color when applied thereover.

13. A kit according to claim 9 wherein said marker is selected from a group consisting of: oil-pastel crayons and grease pencils.

14. A kit according to claim 9 including a plurality of tools selected from a group consisting of saws, drills and scoops.

15. A kit according to claim 9 including a plurality of stencils, each stencil provided with a different image for transfer.

16. A method of forming an image in a fleshy shell of a vegetable, comprising the steps of:

(a) cutting an access opening into an interior of the vegetable;

(b) cleaning of the vegetable located in the interior thereof so as to create a shell having a selected thickness;

(c) securing a pattern sheet to an outer surface area of said shell wherein said pattern sheet is provided with a predetermined image that is formed by an ensemble of individual features formed by a plurality of holes formed therethrough, said holes organized in hole sets such that the holes in each such said hole set outline a respective individual feature, said hole sets together defining the predetermined image;

(d) coloring the pattern sheet with a marking medium so that some of said marking medium passes through each said hole thereby producing a discernable segmented outline of each respective individual feature on the outer surface area of said shell; and (e) cutting around each segmented outline and through the shell so as to remove portions thereof corresponding to each respective individual feature.

* * * * *